(12) United States Patent
Kobayashi et al.

(10) Patent No.: US 11,634,330 B2
(45) Date of Patent: Apr. 25, 2023

(54) CARBONACEOUS MATERIAL AND METHOD FOR PRODUCING SAME

(71) Applicant: KURARAY CO., LTD., Kurashiki (JP)

(72) Inventors: Shohei Kobayashi, Kurashiki (JP);
Motomi Matsushima, Kurashiki (JP);
Taketoshi Okuno, Kurashiki (JP);
Hideharu Iwasaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 407 days.

(21) Appl. No.: 16/488,862

(22) PCT Filed: Feb. 23, 2018

(86) PCT No.: PCT/JP2018/006784
§ 371 (c)(1),
(2) Date: Aug. 26, 2019

(87) PCT Pub. No.: WO2018/155648
PCT Pub. Date: Aug. 30, 2018

(65) Prior Publication Data
US 2019/0375641 A1    Dec. 12, 2019

(30) Foreign Application Priority Data
Feb. 27, 2017    (JP) .............................. JP2017-035322

(51) Int. Cl.
| C01B 31/08  | (2006.01) |
| C01B 32/318 | (2017.01) |
| C01B 32/348 | (2017.01) |
| C01B 32/336 | (2017.01) |
| C01B 32/30  | (2017.01) |

(52) U.S. Cl.
CPC ............ *C01B 32/318* (2017.08); *C01B 32/30* (2017.08); *C01B 32/336* (2017.08); *C01B 32/348* (2017.08); *C01P 2004/60* (2013.01); *C01P 2006/12* (2013.01); *C01P 2006/80* (2013.01)

(58) Field of Classification Search
CPC .............................. C01B 32/30; C01B 32/318
See application file for complete search history.

(56) References Cited

U.S. PATENT DOCUMENTS

| 9,269,502 | B2 | 2/2016 | Chang et al. | |
| 10,950,849 | B2* | 3/2021 | Archer | C01B 32/00 |
| 10,984,963 | B2 | 4/2021 | Kobayashi et al. | |
| 2003/0228250 | A1 | 12/2003 | Takeuchi | |
| 2007/0133148 | A1 | 6/2007 | Kondo et al. | |
| 2015/0270072 | A1 | 9/2015 | Sonobe et al. | |
| 2015/0287545 | A1 | 10/2015 | Ogawa et al. | |
| 2015/0329364 | A1 | 11/2015 | Dong et al. | |
| 2016/0064735 | A1 | 3/2016 | Tada et al. | |
| 2020/0308006 | A1 | 10/2020 | Kobayashi et al. | |

FOREIGN PATENT DOCUMENTS

| CN | 102862980 | | 1/2013 |
| CN | 106365141 | | 2/2017 |
| JP | 2000-299259 | A | 10/2000 |
| JP | 2002-249307 | A | 9/2002 |
| JP | 2002-362912 | A | 12/2002 |
| JP | 2003-209029 | A | 7/2003 |
| JP | 2006-24747 | A | 1/2006 |
| JP | 2010-45414 | A | 2/2010 |
| JP | 2011-79705 | A | 4/2011 |
| KR | 10-2012-0076893 | | 7/2012 |
| KR | 10-2014-0082231 | | 7/2014 |
| KR | 10-2015-0039885 | | 4/2015 |
| WO | WO 2005/069321 | A1 | 7/2005 |
| WO | WO 2014/034858 | A1 | 3/2014 |
| WO | WO 2014/034859 | A1 | 3/2014 |
| WO | WO 2014/077229 | A1 | 5/2014 |

OTHER PUBLICATIONS

Japanese Office Action dated Jan. 25, 2022 in Japanese Patent Application No. 2019-501844 (with unedited computer generated English translation), 6pages.
International Search Report dated Apr. 3, 2018 in PCT/JP2018/006784 filed on Feb. 23, 2018.
Combined Taiwanese Office Action and Search Report dated Mar. 26, 2021 in corresponding Taiwanese Patent Application No. 1071065297 (with English Translation of Category of Cited Documents), 8 pages.
International Preliminary Report on Patentability and Written Opinion dated Sep. 6, 2019 in PCT/JP2018/006784 (submitting English translation only), 8 pages.
Office Action dated May 23, 2022, issued in corresponding Chinese Patent Application No. 201880013898.2 w/Machine-English translation.
Office Action dated May 30, 2022, issued in corresponding Korean Patent Application No. 2019-7024455 with machine English translation.
Office Action dated Sep. 1, 2022, in related U.S. Appl. No. 16/343,251.

\* cited by examiner

*Primary Examiner* — Stuart L Hendrickson
(74) *Attorney, Agent, or Firm* — Oblon, McClelland, Maier & Neustadt, L.L.P.

(57) ABSTRACT

The present invention relates to a carbonaceous material which is derived from a plant, having a specific surface area of 1800 to 3000 m²/g as measured by a BET method, a hydrogen element content of 0.42% by mass or less and an oxygen element content of 1.5% by mass or less.

7 Claims, No Drawings

CARBONACEOUS MATERIAL AND METHOD FOR PRODUCING SAME

TECHNICAL FIELD

The present invention relates to a carbonaceous material and a method for producing the carbonaceous material. More specifically, the present invention relates to a carbonaceous material having a large specific surface area and reduced in the content of hydrogen and the amount of a surface functional group, and a method for producing the carbonaceous material.

BACKGROUND ART

Conventionally, activated carbon has been produced using palm shell, wood chips, wood charcoal, peat or coal (e.g., lignite, brown coal, bituminous coal, anthracite) as the main raw material and by subjecting the raw material to a carbonization treatment, an activation treatment and the like. In a liquid phase, activated carbon has been used in use applications including an advanced water purification treatment, the removal of trihalomethane, the clarification of sewage, the cleanup of groundwater and a water purifier. In a gas phase, activated carbon has been used in use applications including the purification of industrial exhaust gas, the removal of mercury, the removal of a refuse incineration gas, and the removal of sulfur oxide or nitrogen oxide from a combustion gas, and is also used in wide varieties of use applications including the recovery of a solvent, the recovery of a process gas, the separation and purification of nitrogen, the decoloration of a medicine or a food, a catalyst, a catalyst carrier, and a carbon material for a an electric double-layer capacitor or a lithium ion capacitor.

In recent years, it has been attempted to use activated carbon as a conductive material for a lithium sulfur battery or an organic radical battery which is expected as a next-generation lithium ion battery, and is added to an active material having significantly poor electrical conductivity as an additive for imparting electrical conductivity.

The performance and its level to be required for the above-mentioned activated carbon that has been used in wide varieties of use applications vary depending on the intended use. For example, when it is intended to use the activated carbon for adsorption purposes, the activated carbon is required to have uniform pore diameters and a specific surface area as high as 500 to 3000 $m^2/g$. When it is intended to use the activated carbon as an electric double-layer capacitor or a lithium ion capacitor that serves as an electric energy storage device, the activated carbon is required to have a large specific surface area of larger than 1000 $m^2/g$ and to be chemically and electrochemically inert, for the purpose of charging/discharging electrolyte ions by means of surface adsorption/desorption or, when used as a conductive material, for the purpose of increasing the contact surface with an active material to improve current collection efficiency.

Accordingly, in order to produce a lithium sulfur battery or an organic radical battery which has high durability, it is effective to reduce the amount of surface functional groups contained in activated carbon used as a conductive material or the amount of crystal terminals, i.e., structure-terminal hydrogen atoms in the activated carbon, which is capable of reacting with an electrolytic solution, thereby preventing the decomposition of the electrolytic solution. As the method for reducing the amount of surface functional groups in activated carbon, a method has been proposed, in which the activated carbon is heat-treated in an inert gas atmosphere to decompose, eliminate the functional groups (e.g., Patent Documents 1 to 5).

Meanwhile, as the method for reducing the amount of structure-terminal hydrogen atoms, a method has been proposed, in which the activated carbon is plasma-treated in the presence of a fluorocarbon gas (e.g., Patent Documents 6 and 7).

PRIOR ART DOCUMENTS

Patent Documents

Patent Document 1: JP-A-2003-209029
Patent Document 2: JP-A-2002-249307
Patent Document 3: JP-A-2002-362912
Patent Document 4: JP-A-2000-299259
Patent Document 5: JP-A-2006-24747
Patent Document 6: JP-A-2010-45414
Patent Document 7: WO 2005/069321 A1

SUMMARY OF THE INVENTION

Problems to be Solved by the Invention

Each of the methods disclosed in Patent Documents 1 to 5 includes a step of subjecting activated carbon that has been activation-treated to a heat treatment. However, the heat treatment employed in the aforementioned methods, which is carried out under a relatively high temperature, may readily cause the decrease in the specific surface area or pore area of the activated carbon. Therefore, in an electrode in which the activated carbon is used as a conductive material, the transportation of electrolyte ions to an active material tends to be inhibited and the resistance tends to increase. For these reasons, a method has been demanded which can reduce the amount of surface functional groups effectively without the need to increase a heating treatment temperature or prolong a treatment time.

In the methods disclosed in Patent Documents 6 and 7, it is necessary to use a fluorocarbon gas that may adversely affect human bodies. It is also needed to use a special treatment device for the treatment of hydrogen fluoride that is generated as the result of this treatment. Furthermore, it is also needed to use a device for generating special plasma, and the device requires a high electric power. Therefore, the methods are economically disadvantageous.

An object of the present invention is to provide a carbonaceous material which has a large specific surface area, is reduced in the amount of electrochemically unstable surface functional groups (e.g., oxygen functional groups) and structure-terminal hydrogen atoms, and has low resistance. Another object of the present invention is to provide a production method whereby it becomes possible to produce the carbonaceous material safely, economically and easily.

Solutions to the Problems

The present inventors have made intensive and extensive studies in order to solve the above-mentioned problem. As a result, the present invention has been achieved. The present invention includes the following preferred aspects.

[1] A carbonaceous material which is derived from a plant, the carbonaceous material having a specific surface area of 1800 to 3000 $m^2/g$ as measured by a BET method, a hydrogen element content of 0.42% by mass or less and an oxygen element content of 1.5% by mass or less.

[2] The carbonaceous material according to [1], wherein a potassium element content is 500 ppm or less.

[3] The carbonaceous material according to [1] or [2], wherein an iron element content is 200 ppm or less.

[4] A method for producing a carbonaceous material according to any one of [1] to [3], comprising a gas-phase demineralizing step of heat-treating plant-derived activated carbon which has an average particle diameter of 100 to 10000 μm and a specific surface area of 1600 to 3000 m$^2$/g as measured by a BET method, in an inert gas atmosphere containing a halogen compound at 500 to 1250° C. to produce the carbonaceous material.

[5] A method for producing a carbonaceous material according to any one of [1] to [3], comprising:

a step of attaching an alkali metal hydroxide onto plant-derived activated carbon having an average particle diameter of 100 to 10000 μm and a specific surface area of 1600 to 3000 m$^2$/g as measured by a BET method; and a gas-phase demineralizing step of heat-treating the alkali metal hydroxide-attached activated carbon produced in the precedent step at 500 to 1250° C. in an inert gas atmosphere containing a halogen compound to produce the carbonaceous material.

Effects of the Invention

According to the present invention, it is possible to provide: a carbonaceous material which has a large specific surface area, is reduced in the amount of electrochemically unstable oxygen functional groups and structure-terminal hydrogen atoms, and can exhibit low resistance for a long period when used as a conductive material; and a method for producing the carbonaceous material.

MODE FOR CARRYING OUT THE INVENTION

Hereinbelow, the embodiments of the present invention will be described in detail. The scope of the present invention is not limited to the embodiments mentioned in this section, and various changes and variations will be possible without departing from the spirit of the invention.

The carbonaceous material according to the present invention is a plant-derived carbonaceous material, and has a specific surface area of 1800 to 3000 m$^2$/g as measured by a BET method and also has a hydrogen element content of 0.42% by mass or less and an oxygen element content of 1.5% by mass or less.

[BET Specific Surface Area]

The specific surface area as measured by a BET method (also referred to as a "BET specific surface area") of the carbonaceous material according to the present invention is 1800 m$^2$/g or more, preferably more than 1800 m$^2$/g, more preferably 1850 m$^2$/g or more, still more preferably 1900 m$^2$/g or more, particularly preferably 2000 m$^2$/g or more, sometimes preferably more than 2000 m$^2$/g, and is also 3000 m$^2$/g or less, preferably 2800 m$^2$/g or less. If the BET specific surface area is more than 3000 m$^2$/g, the mechanical strength of the carbonaceous material may be greatly deteriorated. If the BET specific surface area is less than 1800 m$^2$/g, in a battery in which the carbonaceous material is used as a conductive material in an electrode, pores may be blocked with a decomposition product of an electrolytic solution, and therefore the resistance that is kept at a low level in the initial stage may increase with the lapse of time. Consequently, it is difficult to keep the resistance at the low level for a long period (e.g., preferably for 200 hours in a 3.3 V-driven EDLC). In the present invention, the BET specific surface area can be calculated by a nitrogen adsorption method, and can be calculated by, for example, the method described in the section "EXAMPLES".

[Average Particle Diameter]

The average particle diameter (Dv50) of the carbonaceous material according to the present invention may be adjusted appropriately depending on the intended use or the like. In the case where the carbonaceous material is used as an electrode material, a conductive material or the like in various battery devices, the average particle diameter is preferably 2 to 30 μm. When the average particle diameter is 2 μm or more, the thickening of a paste during the production of an electrode, which is caused by the increase in the amount of fine powdery materials, can be prevented, and therefore the deterioration in the efficiency of the production of the electrode can be prevented. The carbonaceous material can be used preferably for the production of an electrode, because voids each having a sufficient volume can be formed in the carbonaceous material and therefore the migration of an electrolyte in an electrolytic solution in the carbonaceous material is less likely to be prevented. The average particle diameter of the carbonaceous material is preferably 2 μm or more, more preferably 2.1 μm or more, still more preferably 2.5 μm or more, especially preferably 3 μm or more. It is preferred that the average particle diameter of the carbonaceous material is 30 μm or less, because the passage for the diffusion of an electrolyte into the particles is short and therefore rapid charging/discharging into the active material can be achieved in an electrode in which the carbonaceous material is used as a conductive material. For the improvement in input/output properties, it is critical to reduce the thickness of the electrode. For the reduction in the coating thickness of a mix slurry containing an active material or a conductive material onto a current collector in the production of an electrode, it is required to reduce the particle diameter of the active material or the conductive material. From these viewpoints, the upper limit of the average particle diameter is preferably 30 μm or less, more preferably 19 μm or less, still more preferably 17 μm or less, especially preferably 16 μm or less, most preferably 15 μm or less.

[Raman Spectra]

It is preferred for the carbonaceous material according to the present invention to have an intensity ratio (R value=$I_D/I_G$) of 1.2 or more in Raman spectra observed by laser Raman spectroscopy, wherein the intensity ratio is a ratio of the intensity ($I_D$) of a peak appearing around 1360 cm$^{-1}$ to the intensity ($I_G$) of a peak appearing around 1580 cm$^{-1}$. In this regard, the peak appearing around 1360 cm$^{-1}$ is a Raman peak generally referred to as "D band" and is associated with the disturbance or defect of a graphite structure, and the peak appearing around 1580 cm$^{-1}$ is a Raman peak generally referred to as "G band" and comes from a graphite structure. The peak appearing around 1360 cm$^{-1}$ is generally observed at 1345 to 1375 cm$^{-1}$, preferably 1350 to 1370 cm$^{-1}$. The peak appearing around 1580 cm$^{-1}$ is generally observed at 1565 to 1615 cm$^{-1}$, preferably 1560 to 1610 cm$^{-1}$.

The R value, which is the ratio between the intensities of the peaks, is involved in the crystallinity of the carbonaceous material. If the crystallinity of the carbonaceous material is too high, the number of carbon edges may decrease due to the development of the graphite structure and therefore the affinity of the carbonaceous material for an electrolyte may be decreased. As a result, the diffusion resistance of the electrolyte into the insides of pores in the carbonaceous material may increase, leading to the occurrence of, for example, a problem that resistance increases particularly when used at a low temperature. If the crystallinity of the carbonaceous material is too low, an amorphous area may increase and the electrical resistance may increase. From these viewpoints, the R value is preferably 1.25 or more, more preferably 1.3 or more, still more preferably 1.35 or more. From the viewpoint of the affinity for an electrolytic solution, the R value is preferably 1.5 or less.

The G band half-value width is involved in the amount of the disturbance or defect of a graphite structure contained in the carbonaceous material. In this regard, if the half-value width is too small, the amount of the disturbance or defect of a graphite structure contained in the carbonaceous material may be too small, the number of carbon edges may decrease due to the development of the graphite structure and the number of electrolyte coordination sites may also decrease. As a result, the properties at a lower temperature may be deteriorated, leading to the occurrence of, for example, a problem that resistance increases. If the half-value width is too large, the amount of the disturbance or defect of a graphite structure contained in the carbonaceous material may be too large, amorphous areas increases and therefore the resistance may increase. From these viewpoints, the half-value width (G band half-value width) of a peak appearing around 1580 $cm^{-1}$ is 71 $cm^{-1}$ or more, preferably 71.5 $cm^{-1}$ or more, more preferably 72 $cm^{-1}$ or more, still more preferably 72.5 $cm^{-1}$ or more. The G band half-value width is preferably 88 $cm^{-1}$ or less, more preferably 87 $cm^{-1}$ or less, still more preferably 86 $cm^{-1}$ or less, especially preferably 85.5 $cm^{-1}$ or less, very preferably 85 $cm^{-1}$ or less, particularly preferably 84.5 $cm^{-1}$ or less. When the G band half-value width falls within the above-mentioned range, in the case where the carbonaceous material is used as a conductive material in an electrode, the electric resistance can be kept at a low level for a long period.

[Metal Element]

Examples of the metal element to be contained in the carbonaceous material according to the present invention include an alkali metal (e.g., sodium), an alkaline earth metal (e.g., magnesium, calcium) and a transition metal (e.g., iron, copper).

In one embodiment of the present invention, the content of sodium element in the carbonaceous material is preferably 1000 ppm or less, more preferably 500 ppm or less, still more preferably 300 ppm or less, especially preferably 100 ppm or less, infinitely preferably 50 ppm or less. The content of potassium element in the carbonaceous material according to the present invention is preferably 500 ppm or less, more preferably 300 ppm or less, still more preferably 150 ppm or less, particularly preferably 100 ppm or less, especially preferably 50 ppm or less. The content of iron element in the carbonaceous material according to the present invention is preferably 200 ppm or less, more preferably 150 ppm or less, still more preferably 100 ppm or less, especially preferably 60 ppm or less, infinitely preferably 40 ppm or less. The content of each of sodium element, potassium element and iron element in the carbonaceous material is generally 0 ppm or more. When the contents of the metal elements in the carbonaceous material are respectively equal to or lower than the above-mentioned upper limits, it becomes possible to reduce the influence of the metal elements on the electrochemical properties and safety when the carbonaceous material is used as the conductive material. When the contents of potassium element and iron element are small, the contents of other metal elements also tend to be small.

[Hydrogen Element]

The content of hydrogen element in the carbonaceous material according to the present invention is 0.42% by mass or less, preferably 0.39% by mass or less, more preferably 0.3% by mass or less, still more preferably 0.14% by mass or less. When the content of hydrogen element in the carbonaceous material is equal to or lower than the above-mentioned upper limit, the reactivity of the carbonaceous material with an electrolyte is reduced and therefore the carbonaceous material becomes stable. The lower limit of the content of hydrogen element in the carbonaceous material is generally 0.05% by mass or more.

[Oxygen Element]

The content of oxygen element in the carbonaceous material according to the present invention is 1.5% by mass or less, preferably 1.4% by mass or less, more preferably 1.3% by mass or less. When the content of oxygen element in the carbonaceous material is equal to or lower than the above-mentioned upper limit, the reactivity of the carbonaceous material with an electrolyte is reduced and therefore the carbonaceous material becomes stable. The lower limit of the oxygen element in the carbonaceous material is generally 0.1% by mass or more.

The carbonaceous material according to the present invention has very low electric resistance, and therefore can be used suitably as an electrode material for various battery devices, a material for electrostatic removal use, a conductive material and the like. For example, the carbonaceous material is particularly suitable as a conductive material for an electrode in which an active material for a lithium sulfur battery, an organic radical battery or the like has low conductivity. When the carbonaceous material according to the present invention is used, the electric resistance can be kept at a low level for a long period.

The carbonaceous material according to the present invention can be produced by, for example, a method including a gas-phase demineralizing step of heat-treating plant-derived activated carbon having an average particle diameter of 100 to 10000 μm and a specific surface area of 1600 to 3000 $m^2/g$ as measured by a BET method, in an inert gas atmosphere containing a halogen compound at 500° C. to 1250° C. (wherein the step is also referred to as a "gas-phase demineralizing step", hereinafter). The production method may include a step of attaching an alkali metal hydroxide onto plant-derived activated carbon having an average particle diameter of 100 to 10000 μm and a specific surface area of 1600 to 3000 $m^2/g$ as measured by a BET method (wherein the step is also referred to as an "alkali metal hydroxide attachment step", hereinafter). The production method may include, for example:

(1) an activation step of activating a carbonaceous precursor to produce activated carbon that serves as a raw material;

(2) a pulverization step of pulverizing the activated carbon or the carbonaceous material in order to control the average particle diameter of the finally produced carbonaceous material; and/or (3) a step of heat-treating the activated carbon produced in the gas-phase demineralizing step at 500° C. to 1250° C. in an inert gas atmosphere.

The carbonaceous material according to the present invention is plant-derived, and can be produced using a plant-derived carbonaceous precursor (hereinafter, also referred to as a "plant-derived char") as a main raw material. In the present invention, the carbonaceous material is plant-derived. Therefore, even when an alkali metal hydroxide is attached to the raw material and then the resultant product is heat-treated under an inert gas containing a halogen compound, a large specific surface area can be maintained without causing the shrinkage of the structure thereof. Furthermore, the plant-derived carbonaceous material is advantageous compared with mineral-derived carbonaceous materials, synthetic material-derived carbonaceous materials and the like from the viewpoints of the reduction in harmful impurities and the conservation of the environment, a commercial viewpoint and the like.

In the present invention, the plant that can be used as a raw material for the plant-derived char (carbonaceous precursor) is not particularly limited, and examples of the plant include coconut shell, coffee beans, tea leaves, sugar cane, fruits (orange, or banana), straws, a broad-leaved tree, a needle-leaved tree, bamboo and rice husk. These plants may be used alone, or two or more of them may be used in combination. The use of coconut shell as the raw material plant is advantageous from a commercial viewpoint, because coconut shell is available in a large quantity.

The type of the palm that can be used as a raw material for the palm shell is not particularly limited, and examples of the palm include oil palm, coconut palm, salak and double coconut palm. Coconut shells obtained from these palm plants may be used alone, or two or more of them may be used in combination. Among these palm shells, a coconut shell or an oil palm shell, which is a biomass waste produced in a large quantity from coconut palm or oil palm that is used as a food, a detergent raw material, a biodiesel oil raw material and the like is especially preferred, because this coconut shell is readily available and is inexpensive.

In the present invention, each of these plants is available in the form of a char (e.g., a coconut shell char) which is produced by temporarily calcining each of the plants, and it is preferred to use the char as a crude raw material. The term "char" generally refers to a powdery solid material which is produced in a non-molten and unsoftened form by heating a coal and is rich in a carbon content. In the present invention, the term "char" also refers to a powdery solid material which is produced in a non-molted and unsoftened form by heating an organic material and is rich in a carbon content. The method for producing the char from a plant is not particularly limited, and the char can be produced by any method known in the prior art. For example, a plant that serves as a raw material is heat-treated (carbonized), for example, at a temperature of 300° C. or higher for about 1 to 20 hours under an inert gas atmosphere.

[Activation Step]

The plant-derived activated carbon to be used in the present invention can be produced by, for example, carrying out an activation treatment of the carbonaceous precursor (plant-derived char). The activation treatment is a treatment for forming pores in the surface of the carbonaceous precursor to convert the carbonaceous precursor to a porous carbonaceous substance, and makes it possible to produce activated carbon having a large specific surface area and a large pore volume (hereinafter, the activation-treated carbonaceous precursor is also referred to as "raw material activated carbon"). In the case where the carbonaceous precursor is used without being subjected to the activation treatment, the specific surface area or the pore volume is insufficient and it is difficult to secure a large contact area with the active material and to improve the current collection efficiency when the carbonaceous material is used as a conductive material. The activation treatment can be carried out by a method common in the art, and there are mainly two types of treatment methods, i.e., a gas activation treatment and a chemical activation treatment.

As one example of the gas activation treatment, a method is known, in which the carbonaceous precursor is heated in the presence of, for example, water vapor, carbon dioxide, air, oxygen, a combustion gas or a mixed gas thereof. As one example of the chemical activation treatment, a method is known, in which an activator, e.g., zinc chloride, calcium chloride, phosphoric acid, sulfuric acid, sodium hydroxide, potassium hydroxide, magnesium hydroxide and calcium hydroxide, is mixed with the carbonaceous precursor and then the resultant mixture is heated under an inert gas atmosphere. In the present invention, it is preferred to employ the gas activation treatment, since the specific surface area of the raw material activated carbon can be increased and the pore volumes can be controlled easily, and because any process for removing a remaining chemical substance by activating the chemical substance is not needed and therefore the production process may not be complicated. For this reason, it is preferred to employ a gas activation treatment.

In the gas activation treatment, it is preferred to use a combustion gas as an activator gas agent. When a combustion gas is used as an activator gas agent, a raw material activated carbon having a large specific surface area can be produced easily. In particular, in the plant-derived carbonaceous precursor, the pore volume can be controlled easily. In the present invention, when plant-derived raw material activated carbon that is activation-treated with a combustion gas is used, it becomes possible to produce a carbonaceous material having a larger specific surface area and a larger pore volume more easily compared with a case where another carbonaceous precursor is used or a case where raw material activated carbon produced by another activation treatment (particularly chemical activation treatment) is used. In addition, raw material activated carbon produced by gas activation contains a large amount of amorphous carbon and can be oxidized easily even during being cooled. As a result, in activated carbon produced by a gas activation treatment, easily-degradable acidic functional groups can be produced in a larger amount. Therefore, such an advantageous effect of the present invention that a carbonaceous material that can be used suitably as a conductive material capable of maintaining the resistance at a low level for a long period can be provided can be exerted more significantly by reducing the amount of an acidic functional group in the activated carbon. In the present invention, it is more preferred to use plant-derived activated raw material carbon produced by an activation treatment with a combustion gas. In the case where water vapor is present, the water vapor partial pressure in the activation gas is, for example, 20 to 60%, preferably 25 to 50%, more preferably 30 to 40%.

In the present invention, the BET specific surface area of the raw material activated carbon is preferably 1600 $m^2/g$ or more, more preferably 1800 $m^2/g$ or more, still more preferably 2000 $m^2/g$ or more, and is preferably 3000 $m^2/g$ or less, more preferably 2800 $m^2/g$ or less. When the BET specific surface area of the raw material activated carbon falls within the above-mentioned range, it is possible to obtain a carbonaceous material which can be used as a conductive material and can maintain the resistance thereof at a low level for a long period.

The pore volume of the raw material activated carbon is preferably 0.7 mL/g or more, more preferably 0.8 mL/g or more, still more preferably 0.9 mL/g or more. The pore volume is also preferably 3.4 mL/g or less, more preferably 2.9 mL/g or less, still more preferably 2.4 mL/g or less. When the pore volume of the raw material activated carbon falls within the above-mentioned range, it is possible to obtain a carbonaceous material which can be used as a conductive material and can maintain the resistance thereof at a low level for a long period.

In the present invention, the pore volume can be calculated by a nitrogen adsorption method.

The specific surface area or the pore volume of the raw material activated carbon can be controlled by varying the method to be employed for the activation treatment of the carbonaceous precursor or the conditions for the method. For example, when the raw material activated carbon is produced by a gas activation treatment, the specific surface area or the pore volume can be controlled by varying the type of the gas to be used, the heating temperature or the heating time to be employed or the like. In a gas activation treatment, the specific surface area or the average pore diameter of the obtained raw material activated carbon tends to become smaller with the decrease in the heating temperature and become larger with the increase in the heating temperature. In the present invention, when the raw material activated carbon is produced by a gas activation treatment, the heating temperature may vary depending on the type of the gas to be used, and is, for example, about 500 to 1000° C., preferably 500 to 900° C. The heating time is generally about 100 to 500 minutes, preferably 110 to 300 minutes. If the treatment time is shorter than 100 minutes, a specific surface area sufficient for the achievement of the effects of the present invention may not be obtained. If the treatment time is longer than 500 minutes, the mechanical strength of the resultant activated carbon particles may be greatly deteriorated.

In the present invention, the average particle diameter of the raw material activated carbon to be used in the below-mentioned gas-phase demineralizing step or the alkali metal hydroxide-attaching step is preferably 100 μm or more, more preferably 200 μm or more, still more preferably 300 μm or more. The upper limit of the average particle diameter of the activated carbon is 10000 μm or less, more preferably 8000 μm or less, still more preferably 5000 μm or less. When the average particle diameter of the raw material activated carbon falls within the above-mentioned range, the diffusion of the alkali metal hydroxide into the particles proceeds uniformly during the attachment of the alkali metal hydroxide. Furthermore, when the raw material activated carbon is treated under an inert gas containing a halogen compound, the scattering of the raw material activated carbon which is caused as the result of entrainment can be prevented. In the present invention, in order to adjust the average particle diameter of the activated carbon that serves as the raw material to a value falling within the desired range, a step of pulverizing the activated carbon produced by the activation step may be included.

In the present invention, the average particle diameter can be measured by, for example, a laser scattering method.

[Gas-Phase Demineralizing Step]

The plant-derived carbonaceous material can be doped with a large quantity of active material, and is therefore useful as a conductive material for a lithium sulfur battery or an organic radical battery. However, a plant-derived char contains a large quantity of metal elements, particularly potassium (e.g., about 0.3% in coconut shell char) and iron (e.g., about 0.1% of iron element in coconut shell char). When a carbonaceous material produced from the plant-derived char containing metal elements such as potassium and iron in large quantities is used as a conductive material, the carbonaceous material may adversely affect the electrochemical properties and safety. Therefore, it is preferred to reduce the contents of potassium element and iron element in the carbonaceous material as much as possible.

A plant-derived char also contains elements other than potassium element and iron element, such as an alkali metal (e.g., sodium), an alkaline earth metal (e.g., magnesium, or calcium) and a transition metal (e.g., copper) and the other elements, and it is also preferred to reduce the contents of these metal elements. This is because, if these metal elements are contained, impurities may be dissolved in an electrolytic solution during the application of a voltage to an electrode and consequently battery performance and safety are highly likely to be adversely affected.

In the present invention, the gas-phase demineralizing step is a step of subjecting plant-derived activated carbon (raw material activated carbon) having the above-mentioned specified average particle diameter and the above-mentioned specified BET specific surface area to a heat treatment at 500° C. to 1250° C. in an inert gas atmosphere containing an halogen compound to produce a carbonaceous material. By carrying out the gas-phase demineralizing step, sodium element, potassium element, iron element and the like contained in activated carbon that serves as a raw material can be removed with high efficiency. Particularly, iron element can be removed with higher efficiency compared with the case where liquid-phase demineralization is carried out. It is also possible to remove other alkali metals, alkaline earth metals and transition metals including copper and nickel.

The halogen compound to be contained in the inert gas used in the gas-phase demineralizing step is not particularly limited, and examples of the halogen compound include compounds each containing fluorine, chlorine and/or iodine. Specific examples of the halogen compound include fluorine, chlorine, bromine, iodine, hydrogen fluoride, hydrogen chloride, hydrogen bromide, iodine bromide, chlorine fluoride (ClF), iodine chloride (ICl), iodine bromide (IBr), bromine chloride (BrCl), a compound capable of generating each of these halogen compounds upon a heat treatment, or a mixture thereof. These halogen compounds may be used alone, or two or more of them may be used in the form of a mixture. From the viewpoint of the availability and stability, the halogen compound is preferably hydrogen chloride or hydrogen bromide, more preferably hydrogen chloride.

It is preferred that the halogen compound is mixed with an inert gas upon use. The inert gas to be mixed is not particularly limited, as long as the inert gas cannot react with the activated carbon or the carbonaceous material at the treatment temperature. Examples of the inert gas include nitrogen, helium, argon, krypton or a mixed gas thereof, and nitrogen is preferred.

It is preferred that the concentration of an impurity gas, particularly oxygen, contained in the inert gas is as low as possible. The generally acceptable oxygen concentration is preferably 0 to 2000 ppm, more preferably 0 to 1000 ppm.

In the gas-phase demineralizing step, the mixing ratio of the halogen compound with the inert gas is not limited as long as the demineralization can be achieved satisfactorily, and may be adjusted appropriately depending on the type of the halogen compound and/or the inert gas to be used, the condition of the activated carbon to be treated, the treatment amount and the like. From the viewpoint of the corrosion stability of a device to be used and the equilibrium in adsorption of the halogen, the amount of the halogen compound is preferably 0.1 to 10 vol %, more preferably 0.3 to 5 vol %, still more preferably 0.5 to 3 vol %, per the amount of the inert gas. In a liquid-phase demineralization in which the treatment is carried out with a hydrochloric acid solution or the like, a sufficient drying treatment is needed. In contrast, the gas-phase demineralization in which the drying treatment can be performed easily or is not needed is employed advantageously from the viewpoint of productivity and from the industrial viewpoint. In the present invention, the gas-phase demineralization treatment is carried out in the atmosphere of an inert gas containing a halogen compound, and is therefore advantageous because hydrogen at a carbon structural end as well as metal elements can be reduced and the active sites for the carbonaceous material can also be reduced.

The temperature to be employed for the gas-phase demineralization is generally 500° C. to 1250° C., preferably 600° C. or higher, more preferably 700° C. or higher, still more preferably 800° C. or higher, particularly preferably 900° C. or higher, and is preferably 1200° C. or lower, more preferably 1150° C. or lower, still more preferably 1100° C. or lower, particularly preferably 1080° C. or lower, very preferably 1050° C. or lower. In one embodiment of the present invention, the temperature to be employed for the gas-phase demineralization treatment is generally 500° C. to 1250° C., and is, for example, preferably 600° C. to 1200° C., more preferably 700° C. to 1150° C., still more preferably 800° C. to 1100° C., particularly preferably 800° C. to 1080° C., very preferably 900° C. to 1050° C. If the temperature for the gas-phase demineralization is lower than 500° C., the efficiency of demineralization is reduced and the demineralization may not be achieved sufficiently. The temperature for the gas-phase demineralization of higher than 1250° C. is not desirable, because the activation effect of the halogen compound is hardly achieved and the BET specific surface area may be reduced.

The time for the gas-phase demineralization is not particularly limited, and is preferably 5 to 300 minutes, more preferably 10 to 200 minutes, still more preferably 30 to 150 minutes.

The metal elements, particularly sodium, potassium, iron and the like, contained in the activated carbon to be treated can be removed thorough the gas-phase demineralizing step. Therefore, in the carbonaceous material after the gas-phase demineralizing step, the sodium content is preferably 0.05% by mass or less, more preferably 0.03% by mass or less. The potassium content is preferably 0.05% by mass or less, more preferably 0.03% by mass or less. The iron content is preferably 0.02% by mass or less, more preferably 0.015% by mass or less, further preferably 0.01% by mass or less, still more preferably 0.005% by mass or less. When the sodium content, the potassium content and the iron content are equal to or lower than the above-mentioned upper limits, respectively, the deposition of the metal elements on the surface of a separator or an electrode or the occurrence of short circuit associated with the generation of an electrolyte derived from the metal elements rarely occurs in a battery containing the carbonaceous material as the conductive material. Therefore, a battery having high safety can be provided using the carbonaceous material as the conductive material.

The mechanism of efficient removal of sodium, potassium, another alkali metal, another alkaline earth metal or a transition metal through the gas-phase demineralizing step in the present invention is still unclear, but it is considered as follows. A metal such as potassium, contained in a plant-derived char reacts with a halogen compound dispersed in the char to produce a metal halide (e.g., a chloride or a bromide). The metal halide thus produced is vaporized (dissipated) by heating, leading to the demineralization of potassium and iron. In this mechanism of the diffusion of the halide in the char and the production of a metal halide through the reaction, it is considered that potassium and iron can be removed through the high diffusion of the halide in the gas phase with higher efficiency compared with the case of a liquid-phase demineralization. However, the present invention is not limited to this explanation.

The device to be used for the gas-phase demineralization is not particularly limited, as long as the plant-derived activated carbon that serves as a raw material (i.e., raw material activated carbon) and a mixed gas composed of an inert gas and a halogen compound can be heated while mixing. For example, a fluidized bed furnace is used to perform an intralayer distribution process in a continuous mode or a batch mode using a fluidized bed or the like. The amount of the mixed gas to be fed (gas flow rate) is not limited either, and is generally 1 mL/min or more, preferably 5 mL/min or more, still more preferably 10 mL/min or more, per 1 g of the raw material activated carbon.

[Alkali Metal Hydroxide-Attaching Step]

In one embodiment of the present invention, the method for producing the carbonaceous material of the present invention comprises an alkali metal hydroxide-attaching step. In the present invention, the alkali metal hydroxide-attaching step is a step of adding and mixing an alkali metal hydroxide to and with the plant-derived activated carbon that serves as a raw material. In the case where the alkali metal hydroxide-attaching step is included, the step is generally carried out upstream of the gas-phase demineralizing step. When the alkali metal hydroxide is attached, it is possible to accelerate the removal of hydrogen or the removal of oxygen functional groups in the heat treatment in the gas-phase demineralizing step or in the subsequent heat treatment step.

Examples of the alkali metal hydroxide that can be used in the alkali metal hydroxide-attaching step include lithium hydroxide, sodium hydroxide, potassium hydroxide and cesium hydroxide. From the viewpoint of economic performance and operation performance, sodium hydroxide and potassium hydroxide are preferred. From the viewpoint of the effect to prevent the reduction in the specific surface area, sodium hydroxide is more preferred. Each of these alkali metal hydroxides may be used in the form of an anhydride or a hydrate. These alkali metal hydroxides may be used alone, or two or more of them may be used in the form of a mixture.

The amount of the alkali metal hydroxide to be used is not particularly limited, and may be adjusted depending on the type of the alkali metal hydroxide to be used, the physical properties or characteristic properties of the raw material activated carbon or the like. In order to achieve the effect more prominently, it is generally preferred to use the alkali metal hydroxide in an amount of 10 to 400% by mass per 100% by mass of the raw material activated carbon. With taking the economic performance or the mechanical strength of the finished carbonaceous material into consideration, the alkali metal hydroxide is more preferably used in an amount of 15 to 200% by mass, still more preferably 20 to 100% by mass, per 100% by mass of the raw material activated carbon.

The method for attaching the alkali metal hydroxide is not particularly limited. For example, a method may be used, in which raw material activated carbon is added to and immersed in a mixture prepared by dissolving the alkali metal hydroxide in water or an alcohol such as methanol and ethanol and then the solvent is removed from the resultant product. The treatment temperature and the treatment time in the attaching step are not particularly limited, and may be adjusted appropriately depending on the type of the alkali metal hydroxide and/or solvent to be used, the concentration of the solution or the like. For example, in the case where the treatment temperature is too low, the viscosity of a mixture of the alkali metal hydroxide with raw material activated carbon tends to increase, and therefore the diffusion of the alkali metal hydroxide becomes insufficient. As a result, the effect to prevent the decrease in the specific surface area or the effect to accelerate the removal of hydrogen or the removal of an oxygen functional group may not be achieved satisfactorily. In the case where the treatment time is too short, the diffusion of the alkali metal hydroxide becomes insufficient and as a result, the effect to prevent the decrease in the specific surface area or the effect to accelerate the removal of hydrogen or the removal of an oxygen functional group may not be achieved satisfactorily. In one embodiment of the present invention, the treatment temperature in the attaching step is generally 10° C. or higher, preferably about 15 to 80° C., and the treatment time is generally about 10 to 180 minutes in the attaching step.

A method may also be used, in which the alkali metal hydroxide is mixed with raw material activated carbon in solid states and then the resultant mixture is heated to about 300° C. to cause the alkali metal hydroxide to deliquesce and allow to adsorb onto the raw material activated carbon. The activated carbon to which the alkali metal hydroxide has been attached (hereinafter, also referred to as "alkali metal hydroxide-attached activated carbon") obtained by such the methods can also be used directly in the gas-phase demineralizing step.

[Heat Treatment Step]

In the present invention, subsequent to the gas-phase demineralizing step in an inert gas atmosphere containing the halogen compound, it is preferred to carry out a heat treatment step of heating the carbonaceous material produced in the gas-phase demineralizing step in the absence of a halogen compound. As the result of the contact with the halogen compound in the gas-phase demineralization treatment, the obtained carbonaceous material contains the halogen. Therefore, it is preferred that the heat treatment is carried out in the absence of a halogen compound to remove the halogen contained in the carbonaceous material. More specifically, the heat treatment in the absence of the halogen compound is carried out by heat-treating generally at 500 to 1250° C. in an inert gas atmosphere containing no halogen compound. The temperature for the heat treatment in the absence of the halogen compound is preferably equal to or higher than the temperature employed in the gas-phase demineralizing step. The temperature for the heat treatment step is preferably 500 to 1250° C., more preferably 600 to 1200° C., still more preferably 700 to 1200° C., still further preferably 750 to 1200° C., especially preferably 750 to 1150° C., infinitely preferably 800 to 1100° C. When the heat treatment temperature is adjusted to a temperature falling within the above-mentioned range, it is possible to sufficiently remove the halogen in the carbonaceous material while preventing the reduction in the BET specific surface area which may be caused by the occurrence of thermal shrinkage, and it also becomes possible to exhibit low electric resistance for a long period. The heat treatment can be carried out by carrying out the heat treatment while blocking the feeding of the halogen compound after the heat treatment (gas-phase demineralizing step) in an inert gas atmosphere containing the halogen compound. In this manner, the heat treatment in the absence of the halogen compound can be achieved. The time for the heating treatment in the absence of the halogen compound is not particularly limited, and is preferably 5 to 300 minutes, more preferably 10 to 200 minutes, still more preferably 10 to 150 minutes, most preferably 10 to 100 minutes.

[Pulverization Step]

In the present invention, a pulverization treatment may be carried out if necessary, for the purpose of controlling the shape and the particle diameters of the finally obtained carbonaceous material to desired shape and particle diameters. The pulverization treatment may be applied to any one of the raw material activated carbon, the alkali metal hydroxide-attached activated carbon, and the carbonaceous material obtained after the gas-phase demineralization treatment and/or after the subsequent heat treatment.

The pulverization machine to be used for the pulverization is not particularly limited. For example, a bead mill, a jet mill, a ball mill, a hummer mill, a rod mill and the like may be used singly or in combination. From the viewpoint of the reduction in the generation of a fine powder, a jet mill equipped with a classification function is preferred. In the case where a ball mill, a hummer mill, a rod mill or the like is used, a fine powder can be removed by carrying out classification after the pulverization.

When the classification is carried out after the pulverization treatment, the average particle diameter can be adjusted more correctly. Examples of the type of the classification include classification with a sieve, wet-mode classification and dry-mode classification. Examples of the wet-mode classifier include classifiers respectively utilizing the principles of gravitational classification, inertial classification, hydraulic classification, centrifugal classification and the like. Examples of the dry-mode classifier include classifiers respectively utilizing the principles of settling classification, mechanical classification and centrifugal classification.

In the pulverization step, both of the pulverization and the classification may also be achieved using a single device. For example, a jet mill equipped with a dry-mode classification function may be used for achieving both of the pulverization and the classification. Alternatively, a device in which a pulverization machine and a classifier are arranged independently on each other may also be used. In this case, the pulverization and the classification may be carried out continuously, or the pulverization and the classification may be carried out discontinuously.

EXAMPLES

Hereinbelow, the present invention will be described specifically by way of examples. However, these examples are not intended to limit the scope of the present invention.

The methods for measuring the values of physical properties of a carbonaceous material and activated carbon will be described below. However, the values of the physical properties mentioned in the present specification including the section "EXAMPLES" were determined by the following methods.

[Measurement of BET Specific Surface Area]

A specific surface area was determined by a BET method for measuring a nitrogen adsorption isothermal line of a sample using a nitrogen adsorption amount measurement device BELSORP-MAX manufactured by MicrotracBel Corporation.

[Elemental Analysis]

An elemental analysis was carried out using an oxygen-nitrogen-hydrogen analysis device EMGA-930 manufactured by HORIBA, Ltd.

The detection method of the device was an oxygen: non-dispersive infrared method (NDIR), a nitrogen: thermal conductivity detection method (TCD) or a hydrogen: non-dispersive infrared method (NDIR). The correction was carried out using an (oxygen-nitrogen) Ni capsule, $TiH_2$ (H standard sample) and SS-3 (N, O standard sample), 20 mg of a sample, of which the water content had been measured as a pretreatment at 250° C. for about 10 minutes, was placed in the Ni capsule, the sample was degassed in an elemental analysis device for 30 seconds, and then the measurement was carried out. In the test, the analysis was carried out for three samples, and an average value was employed as an analysis value.

[Raman Spectra]

Raman spectra were measured using LabRAM ARAMIS manufactured by HORIBA, Ltd. using a light source having a laser wavelength of 532 nm. In the test, particles were randomly sampled from three areas in each sample, and then the measurement was carried out with respect to the two areas. The conditions for the measurement were as follows: the wavelength range was 50 to 2000 $cm^{-1}$, the integration frequency was 1000 times, and an average value of values measured in six areas in total was calculated as a measurement value. The G band half-value width was measured after subjecting the spectra obtained under the above-mentioned measurement conditions to the peak separation between a D band (around 1360 $cm^{-1}$) and a G band (around 1590 $cm^{-1}$) by Gaussian function fitting. The R value was determined as an intensity ratio $I_D/I_G$ of the intensity of a peak of D band to the intensity of a peak of G band (i.e., a (D band peak intensity)/(G band peak intensity)).

[Measurement of Average Particle Diameter]

The average particle diameter (particle size distribution) of a sample was measured by a laser scattering method in the following manner. A sample was introduced into an aqueous solution containing 0.3% by mass of a surfactant ("ToritonX100" manufactured by Wako Pure Chemical Industries Ltd.), and then the solution was treated with an ultrasonic cleaner for 10 minutes or longer to disperse the sample in the aqueous solution. The particle size distribution was measured using the resultant liquid dispersion. The measurement of the particle size distribution was carried out using a particle diameter-particle size distribution measurement device ("Microtrac MT3000" manufactured by Nikkiso Co., Ltd.). The D50 value was a particle diameter at which the cumulative volume became 50%, and this value was employed as an average particle diameter.

[Measurement of Contents of Metal Elements]

The method for measuring the content of sodium element, the content of potassium element and the content of iron element content was carried out in the following manner. A carbon sample containing sodium element, potassium element and iron element respectively in predetermined amounts was prepared, and then a calibration curve relating to the relationship between the intensities of sodium and potassium Kα lines and the contents of sodium element and potassium element and a calibration curve relating to the relationship between the intensity of iron Kα line and the content of iron element were prepared using an X-ray fluorescent analysis device. Subsequently, the sample was subjected to an X-ray fluorescent analysis to measure the intensities of sodium Kα line, potassium Kα line and iron Kα line, and then the sodium element content, the potassium element content and the iron element content were determined from the previously prepared calibration curves.

The X-ray fluorescent analysis was carried out under the following conditions using LAB CENTER XRF-1700 manufactured by Shimadzu Corporation. A top irradiation-type holder was used, and the sample measurement area was set within a circle having a diameter of 20 mm. The placement of a sample to be measured was carried out as follows: 0.5 g of the sample was placed in a polyethylene-made container having an inner diameter of 25 mm, then the back of the sample was pressed with a plankton net, then the measurement surface of the sample was covered with a polypropylene-made film, and then the measurement was carried out. An X-ray source was set at 40 kV and 60 mA. With respect to potassium, LiF (200) was used as an analyzing crystal, a gas flow-type proportional counter tube was used as a detector, and an area in which the 2θ was 90 to 140° was measured at a scanning rate of 8°/min. With respect to iron, LiF (200) was used as an analyzing crystal, a scintillation counter was used as a detector, and an area in which the 2θ was 56 to 60° was measured at a scanning rate of 8°/min.

Production Example 1

A coconut shell-derived carbonaceous precursor having a BET specific surface area of 500 $m^2/g$ was activated at 900° C. for 120 minutes in an activation gas that was prepared by feeding steam to a kerosene combustion gas (a mixed gas composed of $H_2O$, $CO_2$, CO and $N_2$) so as to adjust the water vapor partial pressure to 35% to prepar coconut shell-derived raw material activated carbon. The BET specific surface area of the coconut shell-derived raw material activated carbon was 2100 $m^2/g$.

Production Example 2

A coconut shell-derived carbonaceous precursor having a BET specific surface area of 500 $m^2/g$ was activated at 900° C. for 90 minutes in an activation gas that was prepared by feeding steam to a kerosene combustion gas (a mixed gas composed of $H_2O$, $CO_2$, CO and $N_2$) so as to adjust the water vapor partial pressure to 35% to prepar coconut shell-derived raw material activated carbon. The BET specific surface area of the coconut shell-derived raw material activated carbon was 1500 $m^2/g$.

Example 1

(Preparation of Carbonaceous Material)

The coconut shell-derived raw material activated carbon produced in Production Example 1 was ground to obtain coconut shell-derived activated carbon having an average particle diameter of 850 to 2360 μm. Subsequently, a nitrogen gas containing 2 vol % of a hydrogen chloride gas (i.e., a mixed gas) was fed to 100 g of the ground coconut shell-derived activated carbon at a flow rate of 10 L/minutes to perform a halogen compound treatment (a gas-phase demineralizing step) at a treatment temperature of 1000° C. for 50 minutes. Subsequently, only the feeding of the hydrogen chloride gas was halted, and a heat treatment (a heat treatment step) was carried out at a treatment temperature of 1000° C. for 50 minutes to obtain a carbonaceous material. The carbonaceous material was crudely pulverized with a ball mill so as to have an average particle diameter of 8 μm, and the resultant product was pulverized with a compact jet mill (co-jet system cy-mkIII) and was then classified to obtain a carbonaceous material (1) having an average particle diameter of 4 μm.

Example 2

The same procedure as in Example 1 was carried out, except that the treatment time in the gas-phase demineralizing step was set to 100 minutes instead of 50 minutes. As a result, a carbonaceous material (2) having an average particle diameter of 4 μm was produced.

Example 3

The coconut shell-derived raw material activated carbon produced in Production Example 1 was ground to obtain coconut shell-derived activated carbon having an average particle diameter of 850 to 2360 μm. An aqueous solution prepared by dissolving 20 g of sodium hydroxide in 100 g of ion-exchanged water was added to 80 g of the ground coconut shell-derived activated carbon so that the ground coconut shell-derived activated carbon was immersed in and impregnated with the aqueous solution for 1 hour, and then the resultant product was dried at 80° C. using a hot-air dryer for 12 hours. The dried activated carbon was treated at a treatment temperature of 1000° C. for 100 minutes while feeding a nitrogen gas containing 2 vol % of a hydrogen chloride gas at a flow rate of 10 L/min. Subsequently, only the feeding of the hydrogen chloride gas was halted, and the activated carbon was further heat-treated at a treatment temperature of 1000° C. for 50 minutes to obtain a carbonaceous material. The carbonaceous material was crudely pulverized with a ball mill so as to have an average particle diameter of 8 μm, and the resultant product was pulverized with a compact jet mill (co-jet system α-mkIII) and then classified to obtain a carbonaceous material (3) having an average particle diameter of 4 μm.

Example 4

The coconut shell-derived raw material activated carbon produced in Production Example 1 was ground to obtain coconut shell-derived activated carbon having an average particle diameter of 850 to 2360 μm. An aqueous solution prepared by dissolving 30 g of sodium hydroxide in 100 g of ion-exchanged water was added to 70 g of the ground coconut shell-derived activated carbon so that the ground coconut shell-derived raw material activated carbon was immersed in and impregnated with the aqueous solution for 1 hour, and then the resultant product was dried at 80° C. using a hot-air dryer for 12 hours. The activated carbon obtained by the drying was treated at a treatment temperature of 1000° C. for 100 minutes while feeding a nitrogen gas containing 2 vol % of a hydrogen chloride gas at a flow rate of 10 L/min. Subsequently, only the feeding of the hydrogen chloride gas was halted, and the activated carbon was heat-treated at a treatment temperature of 1000° C. for 50 minutes to obtain a carbonaceous material. The carbonaceous material was crudely pulverized with a ball mill so as to have an average particle diameter 8 μm, and the resultant product was pulverized with a compact jet mill (co-jet system a-mkIII) and then classified to produce a carbonaceous material (4) having an average particle diameter of 4 μm.

Example 5

The coconut shell-derived activated carbon produced in Production Example 1 was ground to obtain coconut shell-derived raw material activated carbon having an average particle diameter of 850 to 2360 μm. An aqueous solution prepared by dissolving 40 g of sodium hydroxide in 100 g of ion-exchanged water was added to 60 g of the ground coconut shell-derived raw material activated carbon so that the ground coconut shell-derived raw material activated carbon was immersed in and impregnated with the aqueous solution for 1 hour, and then the resultant product was dried at 80° C. using a hot-air dryer for 12 hours. The activated carbon obtained by the drying was treated at a treatment temperature of 1000° C. for 100 minutes while feeding a nitrogen gas containing 2 vol % of a hydrogen chloride gas at a flow rate of 10 L/min. Subsequently, only the feeding of the hydrogen chloride gas was halted, and the activated carbon was heat-treated at a treatment temperature of 1000° C. for 50 minutes to obtain a carbonaceous material. The carbonaceous material was crudely pulverized with a ball mill so as to have an average particle diameter 8 μm, and the resultant product was pulverized with a compact jet mill (co-jet system a-mkIII) and then classified to obtain a carbonaceous material (5) having an average particle diameter of 4 μm.

Comparative Example 1

The same procedure as in Example 1 was carried out, except that the coconut shell-derived raw material activated carbon produced in Production Example 2 was used in place of the coconut shell-derived raw material activated carbon produced in Production Example 1 and the coconut shell-derived raw material activated carbon was ground to obtain a coconut shell-derived activated carbon having an average particle diameter of 850 to 2360 μm. In this manner, a carbonaceous material (6) having an average particle diameter of 4 μm was produced.

Comparative Example 2

The same procedure as in Example 4 was carried out, except that the coconut shell-derived raw material activated carbon produced in Production Example 2 was used in place of the coconut shell-derived raw material activated carbon produced in Production Example 1 and the coconut shell-derived raw material activated carbon was ground to obtain a coconut shell-derived activated carbon having an average particle diameter of 850 to 2360 μm. In this manner, a carbonaceous material (7) having an average particle diameter of 4 μm was produced.

Comparative Example 3

The same procedure as in Example 1 was carried out, except that the gas-phase demineralization treatment was not carried out and only a heat treatment at 1000° C. for 50 minutes using a nitrogen gas that did not contain a hydrogen chloride gas was carried out. In this manner, a carbonaceous material (8) having an average particle diameter of 4 μm was produced.

TABLE 1

| | | Gas-phase demineralizing step | | | | Heat treatment step | | |
|---|---|---|---|---|---|---|---|---|
| | | NaOH loading amount [mass %] | Hydrogen chloride gas [vol %] | Nitrogen gas [vol %] | Temperature [° C.] | Treatment time [min] | Nitrogen gas [vol %] | Temperature [° C.] | Treatment time [min] |
| Example. | 1 | 0 | 2 | 98 | 1000 | 50 | 100 | 1000 | 50 |
| | 2 | 0 | 2 | 98 | 1000 | 100 | 100 | 1000 | 50 |
| | 3 | 20 | 2 | 98 | 1000 | 100 | 100 | 1000 | 50 |
| | 4 | 30 | 2 | 98 | 1000 | 100 | 100 | 1000 | 50 |
| | 5 | 40 | 2 | 98 | 1000 | 100 | 100 | 1000 | 50 |
| Comparative Example | 1 | 0 | 2 | 98 | 1000 | 50 | 100 | 1000 | 50 |
| | 2 | 30 | 2 | 98 | 1000 | 100 | 100 | 1000 | 50 |
| | 3 | — | — | — | — | — | 100 | 1000 | 50 |

<Analysis of Carbonaceous Materials>

Next, each of the carbonaceous materials (1) to (8) was used as a sample, and the hydrogen element content, the oxygen element content, the metal element (sodium element, potassium element, iron element) content, the BET specific surface area, the R value and G band half-value width of the sample were measured. The results are shown in Table 2.

etched Al foil (manufactured by Horsen Corporation) having a thickness of 20 μm with a bar coater, and then the resultant product was dried with a glass tube oven under a pressure-reduced atmosphere at 150° C. for 7 hours. In this manner, carbon-material-containing electrodes (1) to (8) were produced. The thickness of each of the carbon-material-containing electrodes (1) to (8) was 100 μm.

TABLE 2

| | | Hydrogen element content [mass %] | Oxygen element content [mass %] | Na element content [ppm] | K element content [ppm] | Fe element content [ppm] | BET specific surface area [m$^2$/g] | R value [$I_D/I_G$] | G band half-value width cm$^{-1}$ |
|---|---|---|---|---|---|---|---|---|---|
| Example | 1 | 0.383 | 1.351 | 0 | 150 | 22 | 2100 | 1.34 | 72.5 |
| | 2 | 0.373 | 1.322 | 0 | 20 | 18 | 2110 | 1.35 | 72.8 |
| | 3 | 0.125 | 0.821 | 5 | 35 | 20 | 2050 | 1.38 | 82.7 |
| | 4 | 0.105 | 0.815 | 13 | 60 | 21 | 2000 | 1.40 | 83.8 |
| | 5 | 0.082 | 0.803 | 21 | 80 | 19 | 2000 | 1.41 | 84.3 |
| Comparative Example | 1 | 0.421 | 1.314 | 0 | 180 | 7 | 1610 | 1.27 | 71.6 |
| | 2 | 0.148 | 0.958 | 11 | 85 | 13 | 1550 | 1.35 | 83.2 |
| | 3 | 0.468 | 1.623 | 0 | 13000 | 90 | 2080 | 1.20 | 67.8 |

[Production of Films each Containing Carbon Material]

Each of the carbonaceous materials (1) to (8) produced in Examples 1 to 5 and Comparative Examples 1 to 3 was mixed with a styrene butadiene rubber (SBR) (manufactured by JSR Corporation) and carboxy methyl cellulose (CMC) (manufactured by DSK Co., Ltd) in water so that the (electrode material):SBR:CMC became 90:3:2 (by mass), thereby producing a slurry. The resultant slurry was applied onto a white glass slide with a bar coater, and then the resultant product was dried with hot air at 80° C. and then dried with a glass tube oven under a pressure-reduced atmosphere at 150° C. for 7 hours. In this manner, carbon-material-containing films (1) to (8) were obtained. The thickness of each of the carbon-material-containing films (1) to (8) was 100 μm.

The sheet resistance of each of the carbon-material-containing films (1) to (8) was measured using Loresta-GP (manufactured by Mitsubishi Chemical Analytech Co., Ltd.).

[Production of Electrodes each Containing Carbon Material]

Each of the carbonaceous materials (1) to (8) produced in Examples 1 to 5 and Comparative Examples 1 to 3 was mixed with a styrene butadiene rubber (SBR) (manufactured by JSR Corporation) and carboxy methyl cellulose (CMC) (manufactured by DSK Co., Ltd) in water so that the (electrode material):SBR:CMC became 90:3:2 (by mass), thereby producing a slurry. The slurry was applied onto an

[Assembly of Resistance Measurement Cells]

A resistance measurement cell was produced in the following manner using each of the carbon material-containing electrodes (1) to (8).

A type-2032 coil cell was produced and the resistance properties of each of the carbon material-containing electrodes was evaluated. A type-2032 coil cell member was purchased from Hohsen Corporation. A specimen to be used was prepared by punching each of the carbon material-containing electrodes in a size of 14 mm Φ. A separator to be used was prepared by punching a glass fiber separator (manufactured by Nippon Sheet Glass Co., Ltd.) in a size of 17 mm Φ. As an electrolytic solution, a 1.4-mol/L solution of triethylmethylammonium tetrafluoroborate in propylene carbonate (TEMA-BF$_4$/PC) (manufactured by Toyama Pure Chemical Industries, Ltd.) was used. The production of the coil cell was carried out in a glovebox under an argon atmosphere. Two pieces of each of the carbon material-containing electrodes were incorporated in an overlaid state in the coil cell with the separator interposed therebetween, then the electrolytic solution was injected into the coil cell so that the carbon material-containing electrodes and the separator were sufficiently impregnated with the electrolyte solution, and then the resultant product was sealed with a crimping machine.

<Internal Resistance Calculation Method>

The coil cell was connected to a charge-discharge device (BLS5516; manufactured by Keisokuki Center Co., Ltd.), was then charged at a constant current at a current density of 3 mA/cm$^2$ at 25° C. until the voltage reached 3.3 V, and was then held for 200 hours while applying a voltage of 3.3 V. Subsequently, the coil cell was discharged at a constant current (current density: 3 mA/cm$^2$). The voltage dropping property measured for a discharging time of 10 to 30 seconds was approximated to a straight line by least squares method, and the intercept (voltage value) of the straight line at the time point of the start of the discharging was calculated. The difference between the voltage value and the charging voltage 3.3 V was defined as "ΔV", and the internal resistance of each of the carbon material-containing electrodes (after the voltage was maintained at 3.3 V for 200 hours) was calculated in accordance with the following equation.

R=ΔV/I

R: internal resistance (Ω)
ΔV: dropped voltage (V)
I: discharge current (A)

<Analysis and Test Results>

The results of the measurement of the sheet resistance of each of the carbon material-containing films (1) to (8) and the internal resistance of each of the carbon material-containing electrodes (1) to (8) are shown in Table 3.

TABLE 3

| | | Sheet resistance (Ω /□) | 3.3 V, 25° C. 200 Hr Internal resistance (Ω) |
|---|---|---|---|
| Example | 1 | 260 | 130 |
| | 2 | 240 | 115 |
| | 3 | 152 | 90 |
| | 4 | 124 | 76 |
| | 5 | 95 | 60 |
| Comparative Example | 1 | 520 | 430 |
| | 2 | 185 | 315 |
| | 3 | 585 | 420 |

As shown in Table 3, it was observed that, when the carbonaceous materials (1) to (5) produced in Examples 1 to 5 were used, the sheet resistance was greatly reduced and the electrical conductivity was improved compared with the case where the carbonaceous materials (6) and (8) respectively produced in Comparative Examples 1 and 3, each of which has a higher hydrogen element content and a higher oxygen element content, were used. In addition, it was also observed that, even when the hydrogen element content or the oxygen element content was small, the carbonaceous material having a BET specific surface area of less than 1800 m$^2$/g (Comparative Example 2) was increased in internal resistance when used for a long period, while the carbonaceous materials (1) to (5) respectively produced in Examples 1 to 5 were prevented from the increase in internal resistance even when used for a long period.

The invention claimed is:

1. A carbonaceous material, having a specific surface area of 1800 to 3000 m$^2$/g as measured by a BET method,
    a hydrogen element content of 0.05% by mass or more and 0.42% by mass or less; and
    an oxygen element content of 0.1% by mass or more and 1.5% by mass or less,
    wherein the carbonaceous material is derived from a plant and a degree of crystallinity as measured by the ratio $I_D/I_G$ is from 1.2 to 1.5, wherein $I_D$ is the intensity of the D band and $I_G$ is the intensity of the G band in the Raman spectrum of the carbonaceous material.

2. The carbonaceous material according to claim 1, wherein a potassium element content is 500 ppm or less.

3. The carbonaceous material according to claim 1, wherein an iron element content is 200 ppm or less.

4. The carbonaceous material according to claim 1, wherein the hydrogen element content is 0.05% by mass or more and 0.3% by mass or less.

5. The carbonaceous material according to claim 1, wherein the oxygen element content is 0.1% by mass or more and 1.3% by mass or less.

6. A method for producing the carbonaceous material according to claim 1, the method comprising:
    heat-treating plant-derived activated carbon which has an average particle diameter of 100 to 10000 μm and a specific surface area of 1600 to 3000 m$^2$/g as measured by a BET method, in an inert gas atmosphere comprising a halogen compound at 500 to 1250° C. to produce the carbonaceous material.

7. A method for producing the carbonaceous material according to claim 1, the method comprising:
    attaching an alkali metal hydroxide onto plant-derived activated carbon having an average particle diameter of 100 to 10000 μm and a specific surface area of 1600 to 3000 m$^2$/g as measured by a BET method; and
    heat-treating alkali metal hydroxide-attached activated carbon produced in the attaching at 500 to 1250° C. in an inert gas atmosphere comprising a halogen compound to produce the carbonaceous material.

* * * * *